United States Patent
Parga-Cacheiro et al.

(10) Patent No.: US 9,502,198 B2
(45) Date of Patent: Nov. 22, 2016

(54) DEVICE FOR CONTROLLING ELECTRICALLY ACTUABLE VALVES IN DIFFERENT OPERATING MODES

(71) Applicants: Jose-Luis Parga-Cacheiro, Backnang (DE); Dirk Bodenschatz, Stuttgart (DE); Katharina Grimme, Kirchberg an der Jagst (DE)

(72) Inventors: Jose-Luis Parga-Cacheiro, Backnang (DE); Dirk Bodenschatz, Stuttgart (DE); Katharina Grimme, Kirchberg an der Jagst (DE)

(73) Assignee: ROBERT BOSCH GMBH, Stuttgart (DE)

( * ) Notice: Subject to any disclaimer, the term of this patent is extended or adjusted under 35 U.S.C. 154(b) by 88 days.

(21) Appl. No.: 14/366,825

(22) PCT Filed: Nov. 30, 2012

(86) PCT No.: PCT/EP2012/074108
§ 371 (c)(1),
(2) Date: Jun. 19, 2014

(87) PCT Pub. No.: WO2013/092169
PCT Pub. Date: Jun. 27, 2013

(65) Prior Publication Data
US 2015/0022933 A1    Jan. 22, 2015

(30) Foreign Application Priority Data
Dec. 20, 2011  (DE) .................. 10 2011 089 228

(51) Int. Cl.
H01H 47/22 (2006.01)
H01F 7/18 (2006.01)
B60T 15/00 (2006.01)
H01H 50/44 (2006.01)

(52) U.S. Cl.
CPC ............... *H01H 47/22* (2013.01); *B60T 15/00* (2013.01); *H01F 7/1811* (2013.01); *H01H 50/44* (2013.01); *H01F 2007/1888* (2013.01)

(58) Field of Classification Search
CPC .... H01H 47/22; H01H 50/44; H01F 7/1811; H60T 15/00
USPC .......................................................... 361/159
See application file for complete search history.

(56) References Cited

U.S. PATENT DOCUMENTS

| | | | | |
|---|---|---|---|---|
| 4,688,138 A | * | 8/1987 | Nagata | F02D 41/20 123/490 |
| 5,883,776 A | * | 3/1999 | Keegan | H02P 8/14 361/156 |
| 5,892,650 A | * | 4/1999 | Kinoshita | B60T 8/36 361/152 |
| 5,930,104 A | * | 7/1999 | Kadah | H01H 47/325 361/156 |
| 6,657,846 B1 | * | 12/2003 | Philipp | F02D 41/20 123/490 |

(Continued)

FOREIGN PATENT DOCUMENTS

| | | |
|---|---|---|
| DE | 10 2007 057035 | 5/2009 |
| DE | 10 2008 060720 | 8/2010 |

(Continued)

*Primary Examiner* — Dharti Patel
(74) *Attorney, Agent, or Firm* — Norton Rose Fulbright US LLP

(57) ABSTRACT

A device for controlling an electrically actuable valve having a valve coil, including a main switch, situated in the current circuit of the valve coil, for adjusting the current flowing through the valve coil, and a freewheeling path, which has a freewheeling diode and is switched in parallel with the valve coil. A freewheeling switch is provided, by which the freewheeling path is able to be interrupted or closed. This allows for optionally operating the valve in a PMW or in a switching operation.

11 Claims, 1 Drawing Sheet

(56) References Cited

U.S. PATENT DOCUMENTS

| | | | |
|---|---|---|---|
| 8,164,865 B2* | 4/2012 | Critchley | H01H 47/325 361/2 |
| 2007/0007930 A1* | 1/2007 | Bolz | F02D 41/20 323/205 |
| 2009/0015980 A1* | 1/2009 | Fukano | F16K 31/0675 361/194 |
| 2010/0013303 A1* | 1/2010 | Feucht | B60T 8/36 307/31 |
| 2011/0017178 A1* | 1/2011 | McDonald | F02D 1/003 123/520 |
| 2011/0283975 A1* | 11/2011 | Wirrer | F02D 41/20 123/478 |

FOREIGN PATENT DOCUMENTS

| | | |
|---|---|---|
| DE | 10 2009 027340 | 1/2011 |
| EP | 1 400 684 | 3/2004 |

* cited by examiner

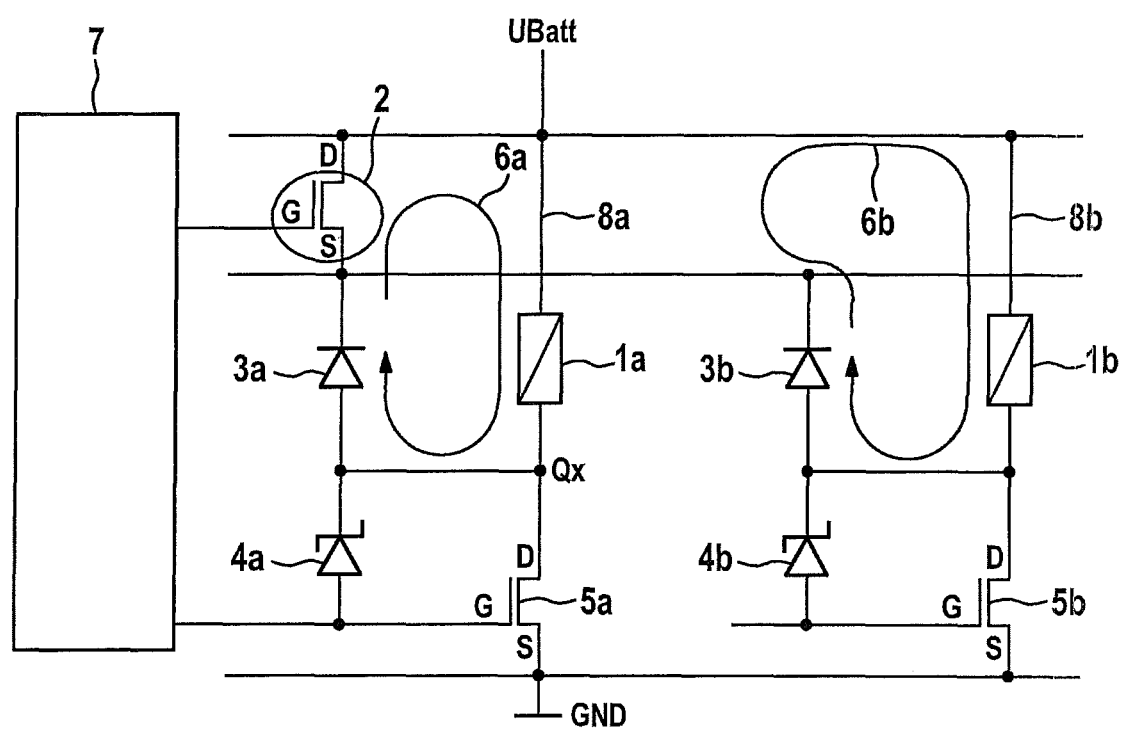

DEVICE FOR CONTROLLING ELECTRICALLY ACTUABLE VALVES IN DIFFERENT OPERATING MODES

FIELD OF THE INVENTION

The present invention relates to a device for controlling electrically actuable valves, and to a brake system having multiple electrically actuable valves.

BACKGROUND INFORMATION

Electrically actuable valves, to which reference is made here, include a valve coil for generating a magnetic field, which is used to open or close the valve. Valves of this type are installed in modern automotive brake systems, as intake, discharge or switchover valves, for instance. These valves are required in order to be able to implement a driving dynamics control or other functionalities, such as an ABS (anti-lock braking systems) or an HHC (hill-hold control). A requirement for this is the ability to automatically build up or dissipate the brake pressure prevailing at the wheel brakes. The discharge valves have the task of shunting the hydraulic pressure out of the individual wheel brakes and into a storage chamber. The intake valves are assigned the task of routing the brake pressure exerted by the master brake cylinder to the individual wheel brakes.

The valves included in the brake circuit are normally controlled by an associated control electronics system. It is set up either for a switching operation or for a PWM operation. That is to say, the valves can be controlled either only in a switching operation or only in a PWM operation.

In the switching operation, the valve is controlled for a predefined period of time, usually at maximum intensity, and then closed again completely. The valve coil is switched to ground while the valve is actuated, e.g., via a ground-side main switch (low side switch). No freewheel is used in order to ensure the most rapid current decay possible once the current has been switched off, but this means that the valve coil generates a relatively high induced voltage, which may impair the functioning of the electronics system. In an effort to restrict the induced voltage, a so-called clamping diode is usually provided, which is connected to a control terminal of the low-side switch and actuates it in such a way that the current flowing within the valve coil is able to be reduced rapidly.

The main advantage of the afore-described switching operation is that the time period during which the valve is open can be adjusted very precisely, and that the switch-off period is relatively short. This results in a highly precise adjustment of the pressure. However, one disadvantage of the switching operation is that the valve generates relatively strong noise in this operating mode, especially noise that the driver can hear.

In the PWM operation, the current flowing through the valve coil is adjusted by a PWM signal (PWM: pulse-width modulation). In the process, the main switch situated in the current path of the valve coil is switched on and off using a specific pulse control factor. In the on-phase, the current in the valve coil rises; in the off-phase, the current is dissipated via a freewheeling device. Valves known from the related art that are actuated in a PWM operation include a freewheel path having a freewheeling diode for this purpose, which is switched in parallel with the valve coil. The PWM control has the advantage that the valve is able to be controlled in a manner that is softer than in the switching operation. This operating mode therefore creates markedly less noise. However, the control is not as exact as in a switching operation and has considerably higher tolerances with regard to the on- and off-periods. As a result, the precision of the pressure adjustment is also not as good as in a switching operation.

SUMMARY OF THE INVENTION

It is an object of the present invention to provide a control electronics system for an electrically actuable valve by which the valve is optionally able to be controlled in a switching operation or in a PWM operation.

In the present invention, this object may be achieved by the features indicated in the independent claims. Additional refinements of the present invention result from the dependent claims.

The present invention provides a control electronics system for controlling an electrically actuable valve, which has a main switch, disposed in the current circuit of the valve coil, for adjusting the current flowing through the valve coil; it also has a freewheeling circuit, switched in parallel with the valve coil, provided with a freewheeling diode. In addition, the control electronics system according to the present invention includes a freewheeling switch, which is able to interrupt or close the freewheeling path. When the freewheeling switch is open, the valve is operable in a switching operation, the freewheeling path being interrupted in this case. When the freewheeling switch is closed, on the other hand, the valve is operable in a PWM operation, the freewheeling path being closed in this case. As a result, the control electronics system of the present invention makes it possible to optionally operate a valve in a switching operation or in a PWM operation. The freewheeling switch may be situated in the freewheeling path of the valve coil.

For example, the switching operation may be selected in situations in which an especially precise pressure adjustment of the brake pressure acting on the wheel brakes is essential, e.g., for an electronic stability program. In other situations, in which the precision of the pressure adjustment is of lesser importance and the focus in on the lowest noise generation possible, the PWM operation is selectable. For example, such driving situations may be states in which a hybrid vehicle is braked using the generator mode, and the brake pressure prevailing in the hydraulic brake system is to be reduced with the least noise generation possible.

The main switch and/or the freewheeling switch may be realized as transistor switch, e.g., as MOS transistor(s).

The control electronics system according to the invention may include a voltage limiting device, which restricts the voltage induced by the valve coil in the switching operation. The device for limiting the voltage may be connected to a ground-side terminal of the valve coil.

For example, the device for limiting the voltage may include a Zener diode or some other suitable component.

According to one special embodiment of the present invention, the voltage limiting device is situated between a ground-side terminal of the valve coil and a control terminal of the main switch. The main switch, for example, could be a transistor disposed on the ground side (low-side switch).

The main switch and/or the freewheeling switch may be connected to a control unit, e.g., a control device, which actuates it/them according to the "switching operation" or "PWM operation" operating mode. In a PWM operation, the main switch may be switched on and off using a specific pulse control ratio, the freewheeling switch being switched on, so that in the off state of the main switch, the current flowing through the valve coil is able to dissipate via the freewheeling path. In the switching operation, on the other hand, the freewheeling switch is in the off position, which means that the freewheeling path is interrupted. In the switching operation, the main switch may be fully switched on, for instance, and be switched off again following a predefined period of time. The voltage induced by the valve coil then dissipates again, which may be via a voltage limiting device such as a transistor, which is actuated via a Zener diode.

If the control electronics system is configured for multiple valves, a single shared freewheeling switch may be provided for multiple valve coils. As an option, it is naturally also possible to have a separate freewheeling switch for each valve coil.

The control circuit of the present invention for electrically actuable valves may be used in an automotive brake system, such as for the purpose of controlling the discharge valves in the execution of different braking functions either in the switching operation or in the PMW operation.

In the following text, the present invention will be explained in greater detail by way of example with reference to the attached drawing.

BRIEF DESCRIPTION OF THE DRAWING

FIG. 1 shows a specific embodiment of a control circuit for controlling multiple electrically actuable valves.

DETAILED DESCRIPTION

FIG. 1 shows a control circuit for two electrically actuable valves, each of which has a valve coil 1a, 1b. With the aid of the control circuit, the valves are optionally controllable in the switching operation or in the PWM operation.

A main switch 5a and 5b, by which the current flowing through valve coils 1a, 1b is adjusted, is connected in main current path 8a, 8b of the valves. Main switches 5a, 5b are situated on the ground side in relation to valve coils 1a, 1b, and therefore are also referred to as low-side switches. They are realized as MOS transistors in this exemplary embodiment. The drain terminal (D) is connected to the ground-side terminal of valve coil 1a or 1b, and the source terminal (S) is connected to ground (GND). The control inputs (G) of main switches 5a, 5b are connected to a control device 7 in each case, which controls them as a function of the "switching operation" or "PWM operation" operating mode.

In the PMW operation, main switches 5a, 5b are switched on and off using a specific pulse control factor. If main switches 5a, 5b are switched on, the current through valve coils 1a, 1b rises. No current is flowing through a freewheeling diode 3a, 3b switched in parallel with valve coil 1a, 1b, since a voltage in the blocking direction is applied at freewheeling diode 3a, 3b. If main switches 5a, 5b are switched off, valve coils 1a, 1b induce a voltage at node Qx, which rises until the diode voltage has been exceeded. A freewheeling current then flows via freewheeling path 3a or 3b, which causes the current to dissipate.

Provided in freewheeling path 3a or 3b is a freewheeling switch 2, which is closed in the PWM operation and thereby allows the current to flow. Freewheeling switch 2 is realized as a MOS transistor in this case, whose control terminal (G) is connected to control device 7.

In the switching operation, on the other hand, freewheeling switch 2 is in the off position, and freewheeling path 3a or 3b is therefore interrupted. To actuate a valve, associated main switch 5a or 5b is actuated and then switched off again following a predefined period of time. In the off state, valve coil 1a or 1b attempts to further drive the current flowing through the valve coil, and generates an induction voltage at node Qx in the process. To avoid overly high voltage peaks, a voltage limitation element 4a or 4b is provided here, which becomes conductive in the blocking direction starting with a predefined voltage threshold. This voltage threshold is considerably higher than the voltage applied at Qx in the freewheeling operation. As soon as voltage limitation element 4a or 4b, such as a Zener diode, begins to conduct, main switch 5a or 5b closes, so that the current flowing through voltage coil 1a or 1b is able to flow to ground (GND) via main switch 5a or 5b. Main switches 5a or 5b remain activated until the current flowing through valve coil 1a, 1b has decayed to such an extent that the induction voltage at node Qx is no longer sufficient to bridge Zener diode 4a, 4b. Main switches 5a, 5b then switch off again.

In FIG. 1, all freewheeling paths 3a, 4b are interconnected and activated or deactivated via a shared freewheeling switch 2. However, this specific embodiment may be used only when all switching valves are to be controlled simultaneously, either in switching operation or in PWM operation. As an alternative, it is also possible to use multiple freewheeling switches. In this case each valve could be actuated independently of the other valves. For example, only the switching valves of a first brake circuit or a first brake could be controlled in the PWM operation, whereas the switching valves of a second brake circuit or a second brake are controlled in the switching operation.

What is claimed is:

1. A device for controlling an electrically actuable valve having a valve coil, the device comprising:
   a control unit configured to control the valve in both a pulse-width modulation (PWM) operation and a switching operation, and to select between the PWM and the switching operations;
   a main switch, situated in a current circuit of the valve coil, for adjusting the current flowing through the valve coil;
   a freewheeling path arrangement that includes a freewheeling diode and that is switched in parallel with the valve coil; and
   a freewheeling switch by which the freewheeling path arrangement is interruptible or closed.

2. The device of claim 1, wherein the freewheeling switch is situated in the freewheeling path.

3. The device of claim 1, further comprising:
   a voltage limiting device, which is connected to a ground-side terminal of the valve coil.

4. The device of claim 3, wherein the voltage limiting device includes a Zener diode.

5. The device of claim 3, wherein there is a voltage limitation element between a ground-side terminal of the valve coil and a control terminal of the main switch.

6. The device of claim 1, wherein, in the PWM operation, the control unit is configured to: switch the main switch on and off according to a specific pulse control factor, and switch on the freewheeling switch.

7. The device of claim 1, wherein at least one of the main switch and the freewheeling switch includes a transistor switch.

8. The device of claim 1, wherein there are multiple valves and a single freewheeling switch is provided for coils of multiple valves.

9. The device of claim 1, wherein the main switch is situated on a ground side in relation to the valve coil.

10. The device of claim 1, wherein, in the switching operation, the control unit is configured to switch off the freewheeling switch to interrupt the freewheeling path.

11. A brake system, comprising:
multiple electrically actuable valves, each of the valves having a valve coil; and a device for controlling at least one of the electrically actuable valve, including:
- a control unit configured to control the valve in both a pulse-width modulation (PWM) operation and a switching operation, and to select between the PWM and the switching operations;
- a main switch, situated in a current circuit of the valve coil, for adjusting the current flowing through the valve coil;
- a freewheeling path arrangement that includes a freewheeling diode and that is switched in parallel with the valve coil; and
- a freewheeling switch by which the freewheeling path arrangement is interruptible or closed.

* * * * *